J. H. COREY.
BOILING APPARATUS.
No. 181,249. Patented Aug. 22, 1876.
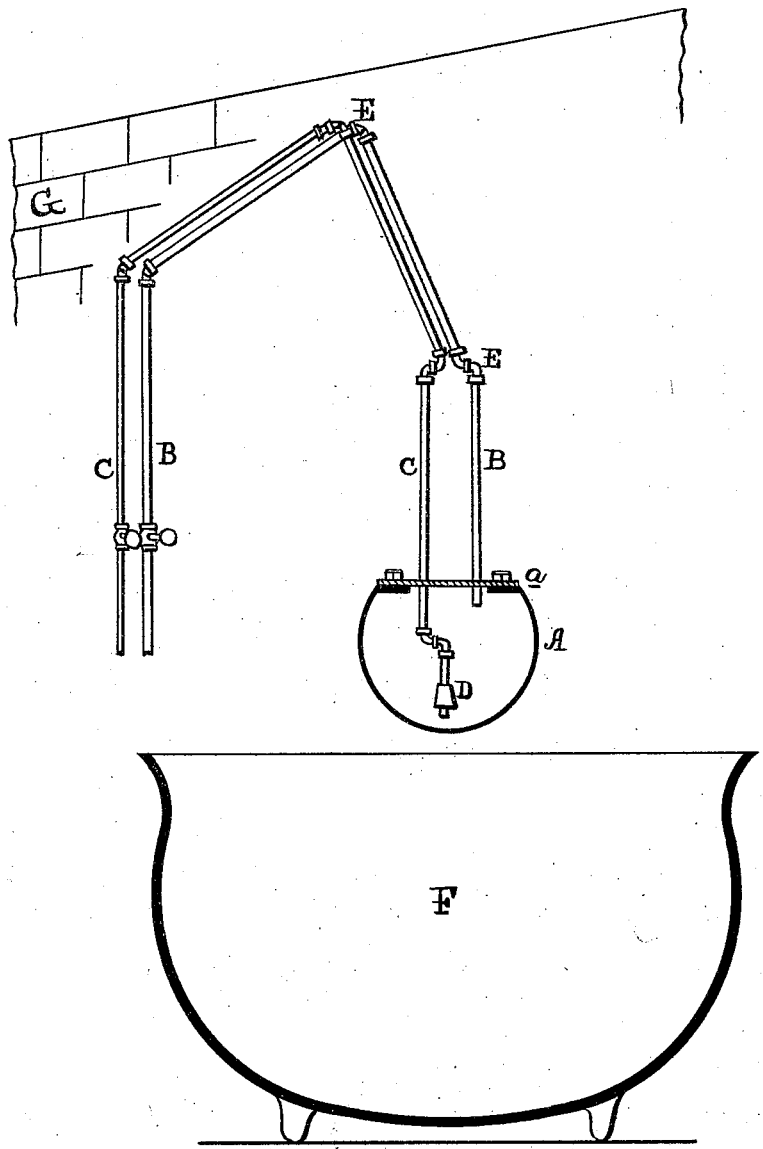
WITNESSES: INVENTOR:

UNITED STATES PATENT OFFICE.

JAMES H. COREY, OF NEW YORK, N. Y.

IMPROVEMENT IN BOILING APPARATUS.

Specification forming part of Letters Patent No. 181,249, dated August 22, 1876; application filed August 4, 1876.

*To all whom it may concern:*

Be it known that I, JAMES H. COREY, engineer, of the city of New York, in the county and State of New York, have invented a new and useful Improvement in Boiling Apparatus, of which the following is a specification, reference being had to the accompanying drawing, which shows a perspective view, partly in section, of my apparatus.

A is a hollow spherical chamber. $a$ is a removable flange. B is the steam or inlet pipe. C is the exhaust or outlet pipe. D is a weight attached to the end of the exhaust-pipe, within the hollow chamber. E E are swivel-joints. F is a kettle or other receptacle. G is a brick wall.

Similar letters of reference indicate corresponding parts.

The object of my invention is to provide a steam apparatus for boiling liquids of any kind in any vessel, irrespective of size or shape, so arranged that it can be inserted in, and removed from, the vessel at will, the construction allowing the apparatus to be raised or lowered, thrown back out of the way, or moved in any position.

I use a hollow metal chamber, A, into which I conduct a steam-pipe, B. From the chamber I lead an exhaust-pipe, C. These pipes are provided with a sufficient number of swivel-joints, E E, to move the chamber in any direction, upward or downward, sidewise, backward, or forward.

At the end of the exhaust-pipe, within the hollow chamber A, I attach a weight, D, in order that the end of the exhaust or outlet pipe shall find the lowest point in taking away the water of condensation, &c., adapting itself, by means of a swivel-joint, to whatever angle it may be placed in a kettle.

The pipes B and C may be fastened to the wall G, or suspended from the ceiling or any other convenient part of a room, or may be made fast inside or outside the kettle.

The vessel in which the boiling is to be done is brought conveniently near the apparatus, within the lengths of pipe provided. The chamber A is lowered within the liquid, the steam turned on, and the boiling rapidly effected. When the temperature of the liquid is sufficiently high, or the boiling carried on long enough, the chamber is raised up out from the liquid, and the vessel removed or replaced by another, or the apparatus changed to another vessel within reach of the pipes. If there is no further use for the apparatus the steam is turned off, and, by means of the swivel-joints, the apparatus is folded upward or backward out of the way. Kettles, barrels, or tubs, &c., can contain the liquid, and all be served with equal facility.

As the chamber is lowered within the liquid, it will readily be understood that all the heat is brought to the center of the liquid to be heated, and no heat can escape without first passing through the liquid. Rapidity in boiling and great economy of steam is the result. The vessel is free from all obstruction, the apparatus being lifted free from the kettle, and whatever residuum is left in the kettle can be entirely removed. In this respect it has a great advantage over a kettle where a permanent steam-coil or a dome is used.

My apparatus can be used for boiling water, coffee, tea, soups, meats, vegetables; also, soap, glue; for bleach-works, dye-works; for the cleaning of barrels in breweries, &c., and wherever it is advantageous to boil by steam without admitting the condensation-water into the material, and for cleansing purposes.

Soups are much improved and clarified by the action of my apparatus. The heat all coming from the chamber A, the circulation is from the center of the liquid outwardly and to the top. All the scum is driven to the surface, and collects at the outer edge, where it is readily removed.

In an ordinary double-jacket steam-kettle, the heat being equal all over the sides and bottom, no direct circulation of the liquid takes place, offering no facilities for taking off the scum, and so leaves the soup roily.

In a double-jacket kettle, the outer shell being the largest, and not having the resistance of the liquid, more heat is radiated through into the room than passes into the water. The greater part of the heat is not only wasted, but results in making the kitchen uncomfortably warm.

My apparatus not only boils quicker, but gives out little or no heat into the room.

I use suitable cocks to regulate the supply of steam. Ball-joints may be used instead of swivel-joints. Flexible hose may be used instead of metal pipes. These modifications, however, do not affect the novel feature of my invention—the dropping down and taking out the steam-chamber from the vessel in which the liquid is to be boiled.

Having thus described my invention, what I claim as new, and desire to secure by Letters Patent, is—

An improved boiling apparatus, consisting of a hollow chamber, having an inlet steam-pipe and an outlet exhaust-pipe, said pipes being fitted with swivel-joints, so as to be moved in any direction, and the end of the exhaust-pipe within the hollow chamber being weighted, so that it shall adapt itself to whatever angle the steam-chamber may be placed in a vessel containing liquid to be boiled, all being made substantially in the manner and for the purpose shown and described.

JAMES H. COREY.

Witnesses:
WM. J. FRYER, Jr.,
CHARLES L. FRYER.